United States Patent [19]
Manssen et al.

[11] Patent Number: 5,809,421
[45] Date of Patent: Sep. 15, 1998

[54] METHOD FOR LOCATING VARIABLE CONTROL CHANNELS BY A MOBILE STATION IN A RADIOTELEPHONE SYSTEM

[75] Inventors: Keith R. Manssen, Long Grove; Robert K. Krolopp, Riverwoods, both of Ill.

[73] Assignee: Motorola, Inc., Schaumburg, Ill.

[21] Appl. No.: 587,601

[22] Filed: Jan. 2, 1996

[51] Int. Cl.$^6$ .................................................. H04Q 7/22
[52] U.S. Cl. .......................... 455/434; 455/432; 455/515
[58] Field of Search .................................... 455/432, 433, 455/434, 435, 411, 515, 524

[56] References Cited

U.S. PATENT DOCUMENTS

| | | | |
|---|---|---|---|
| 5,150,362 | 9/1992 | Akerber | 455/434 |
| 5,295,180 | 3/1994 | Vendetti et al. | 379/59 |
| 5,475,866 | 12/1995 | Ruthenberg | 455/33.1 |
| 5,553,315 | 9/1996 | Sobti et al. | 455/411 |
| 5,583,870 | 12/1996 | Pelprat et al. | 320/337 |
| 5,586,338 | 12/1996 | Lynch et al. | 455/434 |
| 5,613,204 | 3/1997 | Haberman et al. | 455/434 |

OTHER PUBLICATIONS

*Personal Digital Cellular Telecommunication System Standard, RCR STD–27C*, Section 4.1.4–4.1.11 and Appendix B, Research & Development Center for Radio Systems, Jan. 1995, pp. 41–92 and pp. 553–564.

*Primary Examiner*—Edward F. Urban
*Attorney, Agent, or Firm*—John G. Rauch

[57] ABSTRACT

A method for locating variable control channels by a mobile station (104) in a radiotelephone system (100) permits the mobile station (104) to quickly find the location of unknown control channels. A locator beacon (300) is transmitted on one or more common locator channels from each base station (102) or from a locator transmitter which covers the entire region. The locator beacon (300) includes control channel location information which defines the location in the spectrum of a designated control channel. A mobile station (104), including a roaming mobile station outside its home service area, tunes to the locator channel and detects the locator beacon (300) to read the control channel location information. In response, the mobile station (104) tunes to the frequency of the designated control channel to receive a control signal from the base station (102). To prevent co-channel interference, the base stations of a radiotelephone system (100) time division duplex the broadcast of respective locator beacons.

2 Claims, 3 Drawing Sheets

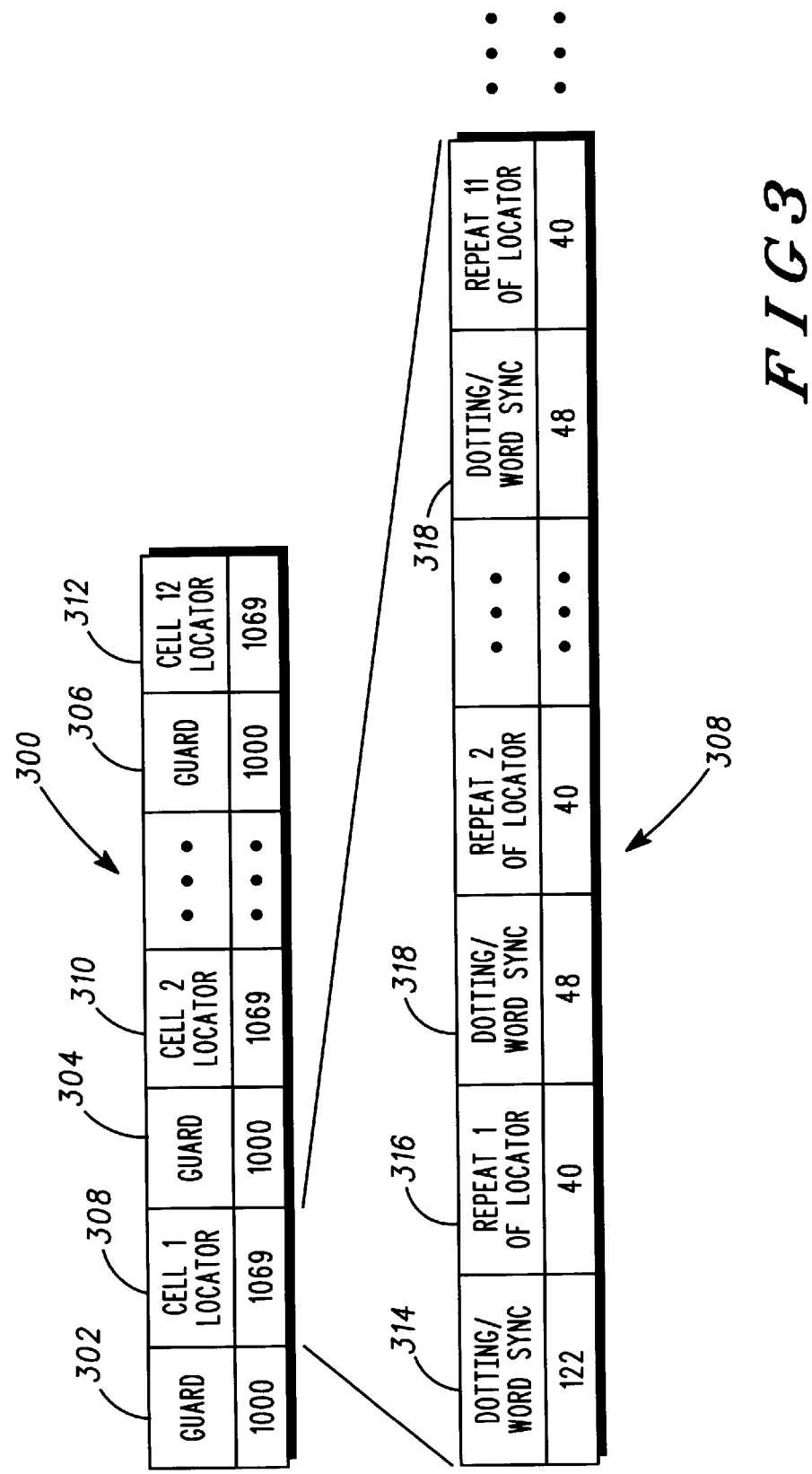

METHOD FOR LOCATING VARIABLE CONTROL CHANNELS BY A MOBILE STATION IN A RADIOTELEPHONE SYSTEM

FIELD OF THE INVENTION

The present invention relates generally to a method for controlling communications in a radiotelephone system. More particularly, the present invention relates to a method for locating variable control channels by a mobile station in a radiotelephone system.

BACKGROUND OF THE INVENTION

A radiotelephone system, such as a cellular telephone system or a cordless telephone system, commonly employs control channels for controlling communications in the system. Such a system commonly includes a plurality of base stations which are in radio communication with mobile stations located in fixed geographic areas served by the base stations. Communication between the base station and mobile stations occurs on voice channels, which carry voice information, and on control channels, which carry control and signalling information.

In most radiotelephone systems, control channels in a radiotelephone system are fixed at predetermined frequencies. When a mobile station seeks to initiate communication, or to obtain control information, the mobile station selects one of the predetermined frequencies for receiving or transmitting control information. Since the locations (in frequency) of the control channels are known by the mobile station, the mobile station can quickly locate a control channel.

Different radiotelephone systems employ different frequencies for control channels. Variations in control channel locations may be dictated by system requirements, by differences in the carriers who operate the respective systems, or by availability of radio frequency spectrum. As a mobile station moves among such systems, known as roaming, the mobile station must search to locate the control channels used in each system.

The situation of variably located control channels is particularly prevalent in some modern systems now being added to the spectrum. In some regions of the country, portions of the spectrum are occupied by other radio systems, such as point-to-point microwave systems. Therefore, in some regions of the country, frequencies allocated to control and voice channels may be shifted relative to similar channels used in compatible systems in other regions of the country.

Variable location of control channels may slow or prevent subscriber units which move among compatible radiotelephone systems in different regions from locating locally defined control channels. When a mobile station seeks a control channel, the mobile station must search the available spectrum to locate a proper control channel. This search process can take several seconds or even several minutes. This delay in locating control channels is manifested to the user of the mobile station as a lengthy delay in the ability to make a call from the mobile station. This delay is unacceptable to most users.

Accordingly, there is a need in the art for a method for rapidly locating variable control channels by a mobile station in a radiotelephone system.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify identical elements, and wherein:

FIG. 3 is a block diagram illustrating a locator beacon for use in the radiotelephone system of FIG. 1 operating according to the present invention.

DETAILED DESCRIPTION OF THE PREFERRED EMBODIMENTS

Figure 1:
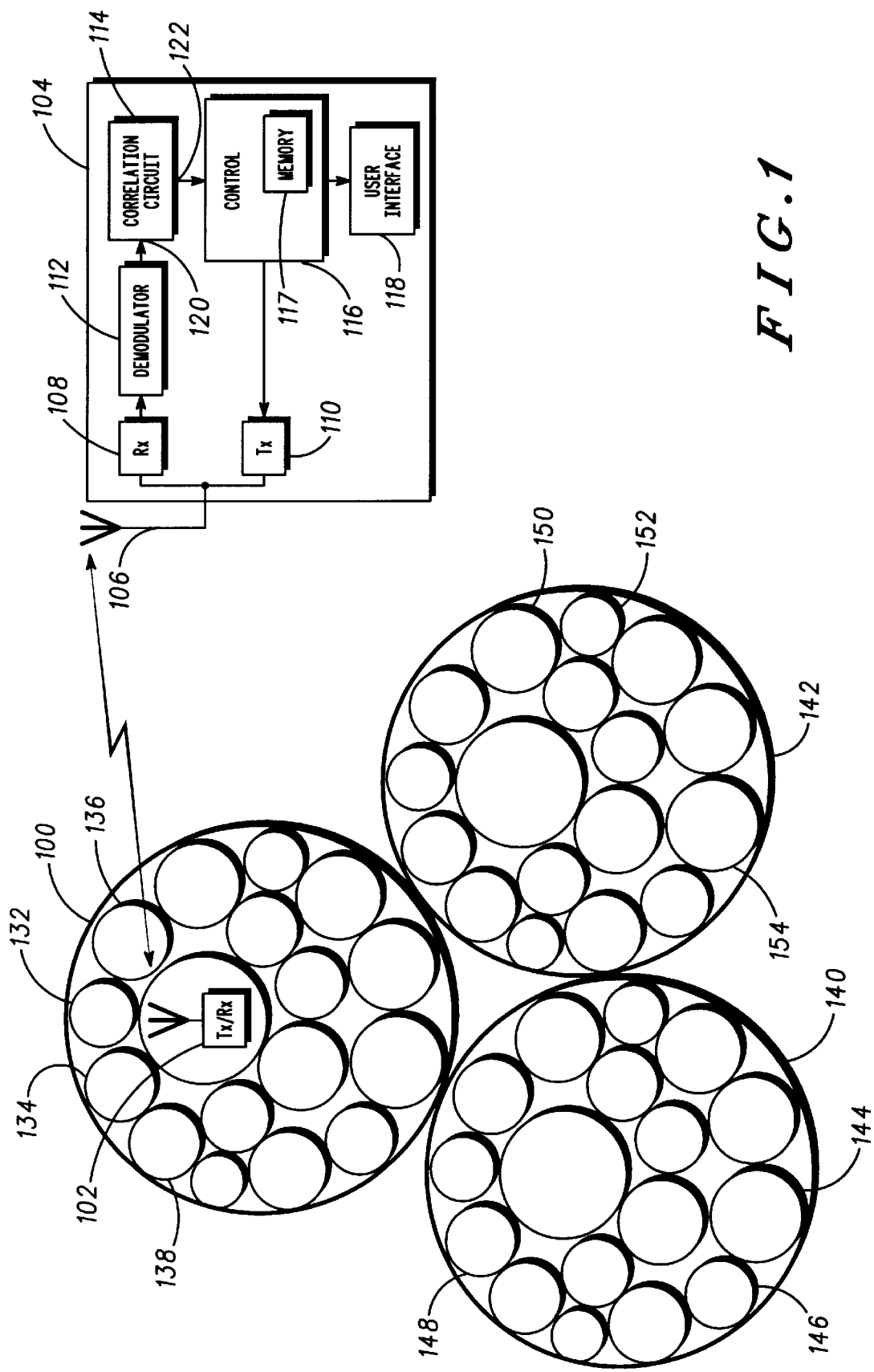
FIG. 1 is an illustration in block diagram form of a plurality of radiotelephone systems which may employ the present invention.

FIG. 1 is an illustration in block diagram form of a plurality of radiotelephone systems, including radiotelephone system 100, radiotelephone system 140, radiotelephone system 142 and mobile station 104. Each radiotelephone system is configured to provide radiotelephone service to mobile stations such as mobile station 104 located within a geographic area indicated by the boundary of the radiotelephone system. As illustrated in FIG. 1, the geographic area served by each radiotelephone system 100, 140, 142 is round in shape, but, as is well known in the art, such radiotelephone systems may be any shape, including square, triangular or hexagonal. The radiotelephone systems may be cellular or cordless telephone systems or other similar communication systems.

Each respective radiotelephone system, such as radiotelephone system 100, operates generally independently of the other radiotelephone systems, such as radiotelephone system 140 and radiotelephone system 142. Thus, system 100 may be operated by a different service provider than system 140 or system 142, or mobile stations freely operable in system 100 may only be operable under limited conditions in system 140 or system 142 (known as "roaming"). In this regard, radiotelephone systems 100, 140, 142 operate independently of similar radiotelephone systems throughout a large geographical region, such as the entire country or the entire world. However, mobile stations such as mobile station 104 may be operated in any or all of the radiotelephone systems, including systems 100, 140, 142.

Radiotelephone system 100 includes a plurality of service areas such as service area 130, service area 132, service area 134, service area 136 and service area 138. Radiotelephone system 140 similarly includes service areas such as service area 144, service area 146 and service area 148. Radiotelephone system 142 similarly includes service areas such as service area 150, service area 152 and service area 154. Each service area defines a geographic area which is provided with radiotelephone service by an associated base station. For example, service area 130 is served by base station 102. Base stations which serve service area 132, service area 134, service area 136, service area 138, service area 144, service area 146, service area 148, service area 150, service area 152 and service area 154, respectively, are not illustrated in FIG. 1 so as not to unduly complicate the drawing figure.

Each base station, such as base station 102, is configured for radio communication with one or more mobile stations such as mobile station 104 under control of a network controller (not shown) The network controller controls operation of the radiotelephone system 100. Similarly, a network controller controls operation of radiotelephone system 140 and radiotelephone system 142. Within each radiotelephone system, the service areas, or cells, are arranged according to a cell re-use pattern to permit re-use of radio frequencies or channels. This promotes efficient use of radio channels and limits co-channel interference, as is well-known in the art.

Operation of a base station in one of the radiotelephone systems will be discussed using base station 102 as an example. However, it is to be understood that all base stations serving all service areas operate in substantially the same manner.

The base station 102 sends and receives radio frequency (RF) signals to and from mobile stations within a fixed geographic area. The RF signals include voice information and digital data transmitted serially and modulated by a carrier frequency. The RF signals further include a plurality of control channels for conveying control information for communication between the mobile station 104 and the base station 102. Radio communication between the base station 102 and the mobile station 104 is maintained according to a predetermined protocol.

The mobile station 104 is one such mobile station or radiotelephone handset contained within the geographic area. The mobile station 104 may comprise a mobile radiotelephone mounted in an automobile or other vehicle, or the mobile station 104 may comprise a portable radiotelephone which may be carried by the user. The mobile station 104 may be transported and operated anywhere in the geographic area served by the base station 102. Also, the mobile station 104 may be transported and operated outside the service area 130 served by the base station 102, in areas served by other base stations similar to base station 102, such as service area 132 or service area 134 in radiotelephone system 100, or in service areas such as service area 148 in radiotelephone system 140 or service area 154 in radiotelephone system 142. Base stations serving these other service areas may use different frequencies for control channels, data channels and voice channels while operating according to the same communications protocol as the base station 102 to communicate with mobile stations such as mobile station 104. Thus, the mobile station 104 may be operated in a home system, including the base station 102 in radiotelephone system 100, and in foreign systems including in radiotelephone system 140 and radiotelephone system 142. Operation in foreign systems is known as roaming.

The mobile station 104 includes an antenna 106, a tunable receiver 108, a transmitter 110, a demodulator 112, a correlation circuit 114, a controller 116 and a user interface 118. Upon reception of RF signals, the mobile station 104 receives the RF signals through the antenna 106. The antenna 106 detects the received RF signals. The tunable receiver 108 is coupled to the antenna and converts the RF signals into baseband signals. The channel or frequency at which the tunable receiver receives signals is controlled by the controller 116. The demodulator 112 is coupled to the receiver 108. The demodulator 112 demodulates the baseband signals, and provides the data to the correlation circuit 114. The correlation circuit 114 correlates the digital data and recovers the data transmitted on the RF signals. The correlation circuit 114 provides the recovered data to the controller 116. The controller 116 includes a memory 117 for storing instructions and data for operating the mobile station 104. The controller 116 formats the data into recognizable voice or information for use by user interface 118. The user interface 118 communicates the received information or voice to a user. Typically, the user interface 118 includes a display, a keypad, a speaker and a microphone (not shown).

Upon transmission of radio frequency signals from the mobile station 104 to the base station 102, the user interface 118 transmits user input data to the controller 116. The controller 116 formats the information obtained from the user interface 118 and transmits it to the transmitter 110 for conversion into RF modulated signals. The transmitter 110 conveys the RF modulated signals to the antenna 106 for transmission to the base station 102.

As noted above, the base station 102 sends and receives control channels for conveying control information between the base station 102 and the mobile station 104. In one embodiment, the method according to the present invention includes the steps of transmitting a locator beacon from each base station of the plurality of base stations, the locator beacon including control channel definition information, the control channel definition information identifying the predetermined channel location of a designated control channel, and transmitting the locator beacon at a predetermined common frequency by each base station. Each control channel has a predetermined channel location. The predetermined channel location is a frequency location. If the radiotelephone system 100 is operated as a time division, multiple access (TDMA) system, the predetermined channel location has a time slot location, also. In one well-known system, the base station 102 transmits 21 control channels. A larger or smaller number of control channels may be employed as communication traffic conditions require. The step of transmitting the control channel definition information preferably includes the step of including data in the control channel definition information, the data being indicative of transmission frequency of the designated control channel.

To initiate communication with the base station 102, the mobile station 104 must receive control information from the base station 102. The control information may include an assignment by the base station 102 of voice or data channels to be used by the mobile station 104 for initiating communication. To receive the control information, the mobile station must receive and read one of the control channels broadcast by the base station 102.

The mobile station 104 preferably stores in memory 117 control channel location information for control channels in its home system. For example, the mobile station 104 stores in memory 117 a last received control channel identifier which identifies the last received control channel. Upon initiation of operation of the mobile station 104, such as upon first powering up the mobile station 104, the controller 116 reads the control channel location information including the last received control channel identifier from the memory 117 and causes the receiver 108 to detect the control channel at the channel location defined by the last received control channel identifier. Using the channel location information for one control channel, the mobile station 104 scans all control channels defined for the radiotelephone system 100. The mobile station keeps a record of control channel information for its home system.

When the mobile station 104 is roaming, the stored control channel information for the home system may not apply to foreign systems where the mobile station 104 attempts to operate. Control channels may be assigned to different locations in the spectrum in different geographic locations. Also, control channels in foreign systems may be non-sequential or may not be contiguously located in the spectrum.

When the mobile station 104 does not store the appropriate control channel location information, the mobile station 104 must scan the spectrum to locate the local control channels. Scan algorithms may take several seconds or even several minutes to locate the serving system. Each carrier, which operates a radiotelephone system such as the radiotelephone system 100 and serves each regional market, may have to place its signalling channels including control channels in different locations or frequencies in the band. The time necessary to locate the local control channels is unacceptable to many users.

In accordance with the present invention, to decrease the time necessary to acquire these local control channels, one or more predetermined locator channels, or predetermined common frequencies, are defined which are common to each base station in all radiotelephone systems. These locator channels are defined in addition to the control channels used by the system. The one or more locator channels are kept clear across a broad region, such as a nation or nations or even world wide. The one or more locator channels each includes a locator beacon transmitted from each base station in every radiotelephone system in every region. The locator beacon contains control channel definition information. The control channel definition information on the locator beacon directs the mobile station 104 to the signalling channels used by base stations in that radiotelephone system. When roaming, the mobile station 104 tunes to the nationwide locator channel, receives the locator beacon and reads the local control channel definition information from the locator beacon. In response to this control channel definition information, the mobile station 104 selects one of the one or more control channels and detects the control signal carried on that control channel. Having acquired the control channel, processing of communication between the base station and the mobile station 104 may continue as usual.

In one embodiment, the locator beacon is transmitted on one or more common channels by all base stations in a radio telephone system. In an alternative embodiment, the locator beacon is transmitted from a locator transmitter located at a single location, or a few locations, rather than from all base stations. This single location may be associated with one of the base stations in the radiotelephone system or may be separately located. This embodiment is preferred when a single powerful transmitter or tall antenna mast is available for broadcasting the locator beacon to all service areas in the radiotelephone system.

Figure 2:
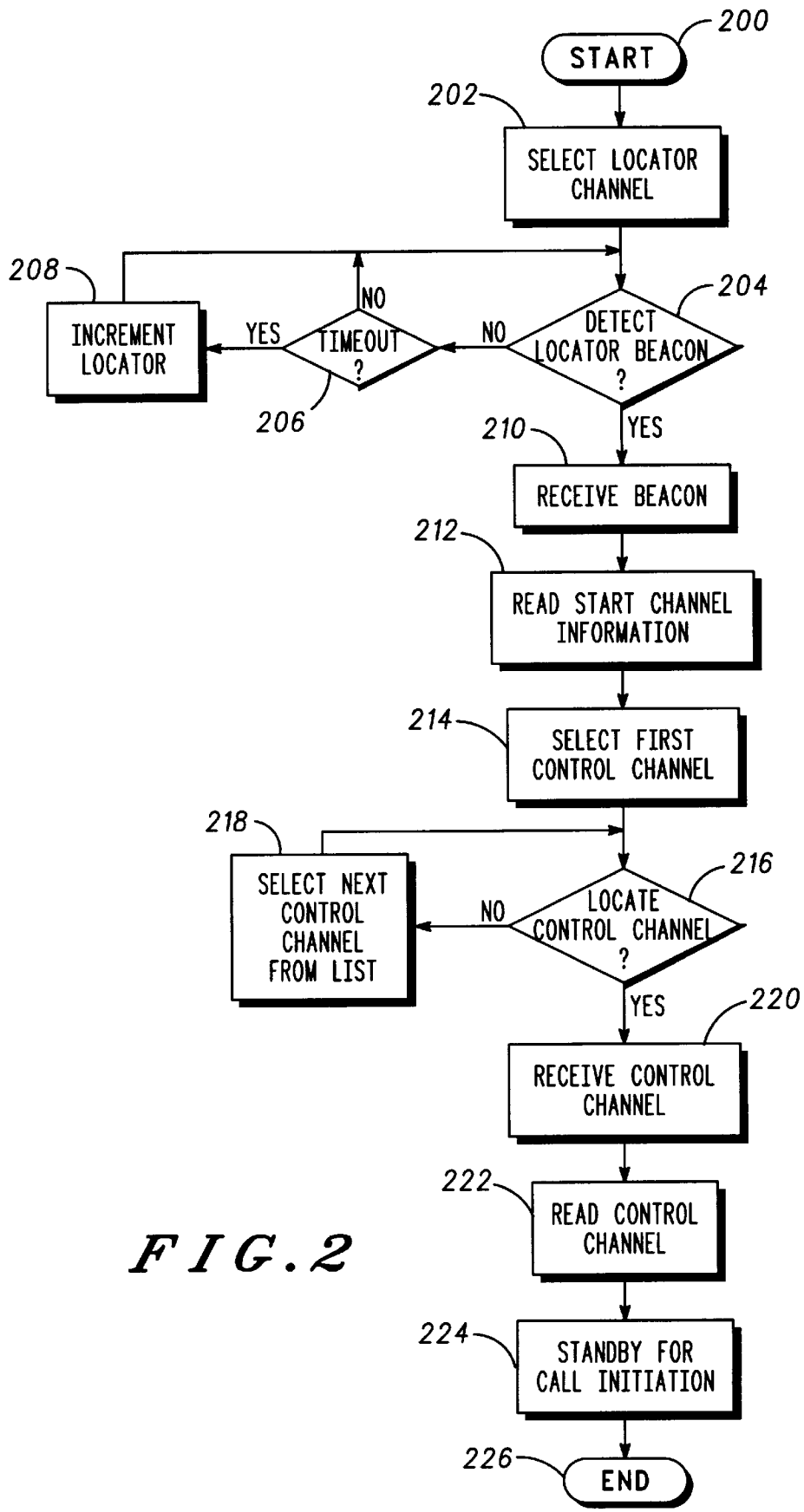
FIG. 2 is a flow chart illustrating a method of operating the mobile station in the radiotelephone system of FIG. 1 according to the present invention.

FIG. 2 is a flow chart illustrating a method of operating the mobile station 104 in the radiotelephone system 100 of FIG. 1 according to the present invention. While the method is described in connection with radiotelephone system 100, it is to be understood that the method may be used in conjunction with any appropriate radiotelephone system such as radiotelephone system 140 or radiotelephone system 142. The method begins at step 200.

At step 202, the mobile station 104 selects the predetermined locator channel. The receiver 108, under control of the controller 116 (FIG. 1) is tuned to detect frequencies including the predetermined common frequency of the locator channel. Preferably, the tunable receiver is tuned to the single channel containing the locator channel for detecting the locator beacon. The controller 116 stores data indicative of this frequency in memory 117. Preferably, the locator beacon is transmitted on a single channel or locator channel which has a channel location that is predefined across a broad region, such as the entire country, and is common to each system in the region and common to each base station in each system. The channel location includes the frequency at which the locator channel is broadcast and, if appropriate in a TDMA system, the time slot where the locator channel is located. According to the preferred embodiment of the present invention, a single locator channel is defined. However, more than one locator channel may be defined if necessary.

At step 204, the mobile station 104 determines if a locator beacon has been detected by the receiver 108. The locator beacon is a predetermined signal transmitted by a base station, such as base station 102 (FIG. 1), on the locator channel. Alternatively, as noted above, radiotelephone system 100 may include a locator transmitter located at one or a few locations. In such an embodiment, the locator beacon is transmitted from the locator transmitter to provide coverage for the entire coverage area of the radiotelephone system 100.

The locator beacon includes control channel definition information. Preferably, the control channel definition information identifies the predetermined channel location of a designated control channel. In a radiotelephone system where control channels are located sequentially in the spectrum, the designated control channel is one control channel of the sequential channels, for example, the first control channel. Alternatively, the control channels may be non-sequential or non-contiguous and in such a radiotelephone system, the control channel definition information includes a list of control channel locations. A preferred format for the locator beacon will be discussed below in conjunction with FIG. 3. The mobile station 104 may not detect a locator beacon if the mobile station 104 is located in an area that does not have radiotelephone service. Also, the mobile station 104 may not detect a locator beacon if more than a single locator channel is defined and the receiver 108 is tuned to detect a channel which is not present.

If no locator beacon is detected, control proceeds to step 206 where a time-out condition is checked. If the mobile station 104 has been attempting to detect a locator beacon for more than a predetermined amount of time, then control passes to step 208. At step 208, if more than a single locator channel is present, the locator channel is incremented and the receiver 108 is tuned to detect the new locator channel. Control then resumes with step 204. The tunable receiver is tuned to a second channel for detecting the locator beacon. If only a single locator channel is defined, or if all of the defined locator channels have been scanned, the mobile station 104 may enter a sleep mode to conserve battery power for a predetermined amount of time. If, at step 206, the time-out or other condition was not met, control continues at step 206.

Once a locator beacon has been detected at step 204, the locator beacon is received at step 210. The receiver 108, the demodulator 112 and the correlation circuit 114 operate to recover the data which form the control channel definition information transmitted on the RF signals which form the locator beacon. At step 212, the content of the locator beacon is read by the mobile station 104. The recovered data is provided to the controller 116. The data is preferably arranged in a predetermined format for interpretation by the controller 116 and includes channel definition information. In response to the channel definition information, at step 214, the controller 116 tunes the receiver 108 to a new frequency defined by the control channel information. The new frequency is the designated control channel where the mobile station 104 should begin scanning to locate control channels transmitted by the base station which transmitted the locator beacon.

At step 216, the mobile station 104 begins searching for a control channel at the frequency of the designated control channel. At this point, communication and initialization between the base station and the mobile station 104 proceed substantially the same as if the mobile station 104 was located in its home system.

If no control channel is located at the control channel frequency, control passes to step 218. If the control channel location information included a list of control channels, the mobile station selects the next control channel on the list and begins searching for a control channel at that location. If the control channel information includes a designated control channel identifying block of control channels, the mobile station increments the control channel which it is currently searching. Preferably, the base station broadcasts a large number, such as 21, control channels and the mobile station scans these control channels searching for a control signal from the base station.

When a control signal broadcast from the base station on a control channel is found, control passes to step 220 where the control channel is received. The data forming the control signal is read by the mobile station 104 and processed at step 222. At step 224, the mobile station 104 enters a standby mode to await call initiation or any other further activity. The method ends at step 226.

FIG. 3 is a block diagram illustrating a locator beacon 300 for use in the radiotelephone system 100 of FIG. 1 operating according to the present invention. The locator beacon 300 is preferably a wideband data stream broadcast by a base station such as base station 102 for receipt by any mobile station such as mobile station 104 (FIG. 1) in the geographic area served by base station 102.

Since the locator beacon according to the present invention is transmitted by all base stations, there is a risk of co-channel interference between base stations which service adjacent service areas or cells. One way to eliminate or reduce the risk of co-channel interference is to synchronize all of the base stations in transmission of the locator beacons. However, because it is intended that the locator beacon will be transmitted by all base stations, nationwide, under operation of different carriers, such synchronization may be an impossible task.

An alternative solution is provided by the locator beacon 300 illustrated in FIG. 3. Locator beacon 300 is preferably a wideband data stream broadcast by all base stations in all radiotelephone systems across a large region, such as nationwide. The data stream is preferably generated at a rate of 10 kbit/sec ±0.1 bit/sec. The locator beacon 300 includes guard bits 302, 304, 306 separating time division duplexed locator beacons 308, 310, 312 broadcast by respective base stations.

In accordance with the preferred embodiment, the locator beacon 300 is divided into a plurality of time slots equal in number to the number of base stations in the radiotelephone system 100 (FIG. 1) or equal to the number of base stations in the cell re-use pattern of the system 100. For example, if the system employs a cell re-use pattern of 12 cells, the locator beacon is divided into 12 time slots. Each of the 12 time slots includes a predetermined number, such as 1000, guard bits such as guard bits 302, 304, 306 and one of the time division duplexed locator beacons 308, 310, 312. This pattern for the locator beacon 300 allows the mobile station which receives the locator beacon 300 to synchronize to data bursts as opposed to the continuous data stream on a control channel. Transmitting a predetermined number of guard bits, such as guard bits 302, 304, 306, during each respective time slot allows timing to be relaxed for easier implementation. The only timing requirement is that more than one cell is not transmitting simultaneously while a locator beacon is being transmitted.

The preferred, predetermined format for locator beacon 308 is further illustrated in FIG. 3. A first predetermined data pattern 314 includes a 101-bit dotting sequence and an 11-bit word synchronization sequence sent to permit the receiving mobile station to achieve synchronization with the incoming data. The dotting sequence is preferably of the form (1010 . . . 101). The word synchronization sequence is preferably of the form (11100010010). Following the first predetermined data pattern 314, a first repeat 316 of the cell locator is transmitted. The cell locator is preferably a 40 bit word, including parity. The locator is formed by encoding the 28 content bits into a (40, 208) BCH code that has a distance of 5, (40, 28; 5). The left-most bit, (i.e., the earliest in time) is designated the most significant bit. The 28 most significant bits of the 40-bit field are the content bits. The content bits define the control channel definition information for the control channels broadcast by the base station. That is, the locator comprises data indicative of the control channel definition information.

Following each repeat of the 40-bit locator, a second predetermined data pattern 318 is transmitted including a 37-bit dotting sequence and 11-bit word synchronization sequence. The dotting sequence and the word synchronization sequence have the same form as for the first predetermined data pattern. The locator and the second predetermined data pattern are repeated until transmitted a total of eleven times. Thus, each base station transmits substantially identical control channel definition information during its respective time slot.

From the foregoing, it can be seen that the present invention provides a method for locating variable control channels by a mobile station in a radiotelephone system. Each base station nationwide transmits a locator beacon on one of one or more locator channels. The locator beacon includes control channel location information. The control channel location information defines the location in the spectrum of a designated control channel. A mobile station, including a roaming mobile station outside its home service area, tunes to the locator channel and detects the locator beacon to read the control channel location information. In response to the control channel location information, the mobile station tunes to the frequency of the designated control channel to scan for a suitable control channel and receive a control signal from the base station. To prevent co-channel interference, the base stations of a radiotelephone system time division duplex the broadcast of respective locator beacons.

While a particular embodiment of the present invention has been shown and described, modifications may be made and it is therefore intended in the appended claims to cover all such changes and modifications which fall within the true spirit and scope of the invention.

What is claimed is:

1. A method for initiating communication between a mobile station and a base station in a radiotelephone system, the radiotelephone system including a plurality of base stations, each base station configured for radio communication with a plurality of mobile stations including the mobile station within a fixed geographic area, the method comprising the steps of:

transmitting a locator beacon from each base station during a predefined unique time slot assigned to the base station, the locator beacon containing control channel definition information, transmitting the locator beacon including:

repeating transmission of a locator a predetermined number of times during the predefined time slot, and initially transmitting a first predetermined data pattern before repeating transmission of the locator;

transmitting one or more control channels from each base station, the one or more control channels each including a control signal;

receiving the locator beacon during the predefined time slot at the mobile station of the plurality of mobile stations;

reading at the mobile station the control channel definition information from the locator beacon;

in response to the control channel definition information, selecting one control channel as a selected control channel at the mobile station;

detecting a selected control signal on the selected control channel at the mobile station; and entering standby mode to await initiation of communication between the mobile station and one of the plurality of base stations.

2. A method for initiating communication between a mobile station and a base station in a radiotelephone system as recited in claim 1 wherein the step of repeating transmission of the locator includes transmitting the locator separated by a second predetermined data pattern.

* * * * *